US 12,089,771 B2

(12) United States Patent
Katsunuma

(10) Patent No.: US 12,089,771 B2
(45) Date of Patent: Sep. 17, 2024

(54) ELECTRIC KETTLE

(71) Applicant: KALITA CO.,LTD., Kanagawa (JP)

(72) Inventor: Jun Katsunuma, Kanagawa (JP)

(73) Assignee: KALITA CO., LTD., Kanagawa (JP)

( * ) Notice: Subject to any disclaimer, the term of this patent is extended or adjusted under 35 U.S.C. 154(b) by 747 days.

(21) Appl. No.: 17/210,567

(22) Filed: Mar. 24, 2021

(65) Prior Publication Data
US 2021/0204746 A1   Jul. 8, 2021

Related U.S. Application Data

(63) Continuation of application No. PCT/JP2019/037355, filed on Sep. 24, 2019.

(30) Foreign Application Priority Data

Sep. 25, 2018 (JP) .................................. 2018-179478

(51) Int. Cl.
*A47J 27/21* (2006.01)
*G01F 23/263* (2022.01)
*H05B 1/02* (2006.01)

(52) U.S. Cl.
CPC ..... *A47J 27/21091* (2013.01); *A47J 27/2105* (2013.01); *A47J 27/21083* (2013.01);
(Continued)

(58) Field of Classification Search
CPC .............. A47J 27/21091; A47J 27/2105; A47J 27/21166; A47J 27/21083; A47J 2202/00;
(Continued)

(56) References Cited

U.S. PATENT DOCUMENTS

2010/0270284 A1* 10/2010 Cohen ................ A47J 27/21175
219/507
2012/0091117 A1* 4/2012 Cheng ................ A47J 27/2105
219/385
2016/0374500 A1* 12/2016 Bugatti .............. A47J 27/21141
219/435

FOREIGN PATENT DOCUMENTS

CN     204445389 U    7/2015
CN     106213994 A   12/2016
(Continued)

OTHER PUBLICATIONS

Extended European Search Report issued in European Patent Application No. 19866615.8, mailed on Jun. 3, 2022 (8 pages).
(Continued)

*Primary Examiner* — Brian W Jennison
(74) *Attorney, Agent, or Firm* — Nakanishi IP Associates, LLC

(57) ABSTRACT

An electric kettle includes a power supply base and a kettle main body. The kettle main body has a container, a heater provided on the container, a water amount sensor that detects the amount of water in the container, a water temperature sensor that detects the current temperature of the water in the container, and a first display part that displays information on the amount of water detected by the water amount sensor. The power supply base has a power supply cable to be connected to a utility power supply, an operation part that receives a user operation concerning the desired temperature of the water, a power supply circuit that generates a driving power for the heater from an electric power supplied from the utility power supply, and a second display part 46 that displays the current temperature and the desired temperature in a time division manner. The kettle main body includes a battery that drives the water amount sensor and the first
(Continued)

display part when the kettle main body is separated from the power supply base.

6 Claims, 12 Drawing Sheets

(52) U.S. Cl.
CPC ...... *A47J 27/21166* (2013.01); *H05B 1/0269* (2013.01); *A47J 2202/00* (2013.01); *A47J 2203/00* (2013.01); *G01F 23/263* (2013.01)

(58) Field of Classification Search
CPC .. A47J 2203/00; A47J 27/21008; A47J 27/21; H05B 1/0269
See application file for complete search history.

(56) References Cited

FOREIGN PATENT DOCUMENTS

| | | | |
|---|---|---|---|
| CN | 106724805 | A | 5/2017 |
| CN | 206303726 | U | 7/2017 |
| CN | 206560321 | U | 10/2017 |
| DE | 212010000086 | U1 | 6/2012 |
| GB | 2480360 | A | 11/2011 |
| JP | S61-5822 | A | 1/1986 |
| JP | H11-244145 | A | 9/1999 |
| JP | 2005-137555 | A | 6/2005 |
| WO | 2010/139490 | A1 | 12/2010 |

OTHER PUBLICATIONS

International Search Report issued in PCT/JP2019/037355 mailed on Nov. 26, 2019 with English Translation (5 pages).

Office Action issued in Chinese Patent Application No. 2019800062475.4 dated Aug. 27, 2021 (17 pages).

Office Action issued in Chinese Patent Application No. 2019800062475.4 dated Feb. 23, 2022 with English Translation (22 pages).

* cited by examiner

ELECTRIC KETTLE

CROSS-REFERENCE TO RELATED APPLICATIONS

This application is a continuation application of International Patent Application No. PCT/JP2019/037355 filed on Sep. 24, 2019, which is based upon and claims the benefit of priority from the prior Japanese Patent Application No. 2018-179478, filed Sep. 25, 2018, the entire contents of which are incorporated herein by reference.

FIELD

Embodiments described herein relate generally to an electric kettle.

BACKGROUND

An electric kettle has a kettle main body housing a container that can be attached to and detached from a power supply base. The housing in the kettle main body is provided with a heater. When the kettle main body is placed on the power supply base, the heater is driven by electric power supplied from the power supply base to heat water in the container. A user can remove the kettle main body from the power supply base to carry the hot water in the kettle main body. With the electric kettle, in this way, water can be easily boiled simply by placing the kettle main body containing water on the power supply base, so that the electric kettle is used in many shops and homes.

As an electric kettle improved in convenience, there is an electric kettle capable of detecting boiling of water and automatically stopping heating by a heater, for example. There is another electric kettle capable of not only heating water to 100° C. to boil the water but also setting the temperature of the water at 80° C. or the like. Such an electric kettle capable of temperature setting is used in homes for making baby milk, for example. Electric kettles having a function intended for a particular purpose are appearing.

In this trend, some users are enjoying brewing drip coffee at home. The drip coffee varies in taste with the temperature of hot water, the amount of hot water, the time to pour hot water to coffee, the duration of steaming of coffee, and so on. Therefore, the user can brew coffee to taste by managing these factors. However, there has not been an electric kettle that can manage these factors by itself.

SUMMARY OF INVENTION

Technical Problem

The objective is to provide an electric kettle that is highly convenient for a user who requires management of water temperature, water amount and time, in particular.

Solution to Problem

An electric kettle according to an embodiment includes a power supply base, and a kettle main body removably placed on the power supply base. The kettle main body has a container, a heater provided on the container, a water amount sensor that detects an amount of water in the container, a water temperature sensor that detects a current temperature of the water in the container, and a first display part that displays information on the amount of water detected by the water amount sensor. The power supply base has a power supply cable to be connected to a utility power supply, an operation part that receives a user operation concerning a desired temperature of the water, a power supply circuit that generates a driving power for the heater from an electric power supplied from the utility power supply, and a second display part that displays the current temperature and the desired temperature in a time division manner. The kettle main body includes a battery that drives the water amount sensor and the first display part when the kettle main body is separated from the power supply base.

DETAILED DESCRIPTION

Figure 1:
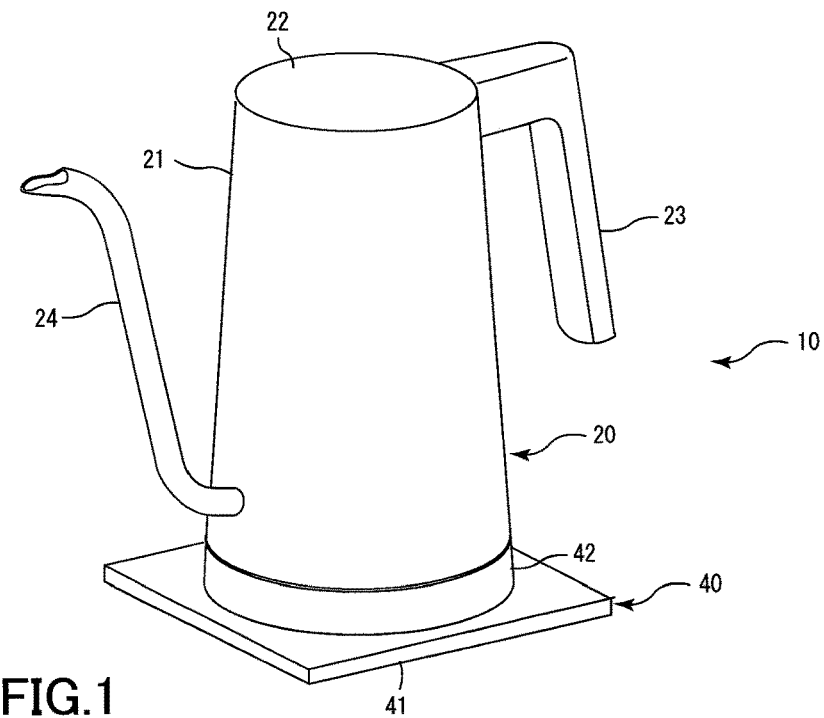
FIG. 1 is a perspective view showing an appearance of an electric kettle according to a first embodiment.

In the following, electric kettles according to first, second and third embodiments will be described with reference to the drawings. In the following description, components having substantially the same functions or configurations are denoted by the same reference numerals, and redundant descriptions thereof will be provided only when necessary.

First Embodiment

Figure 2:
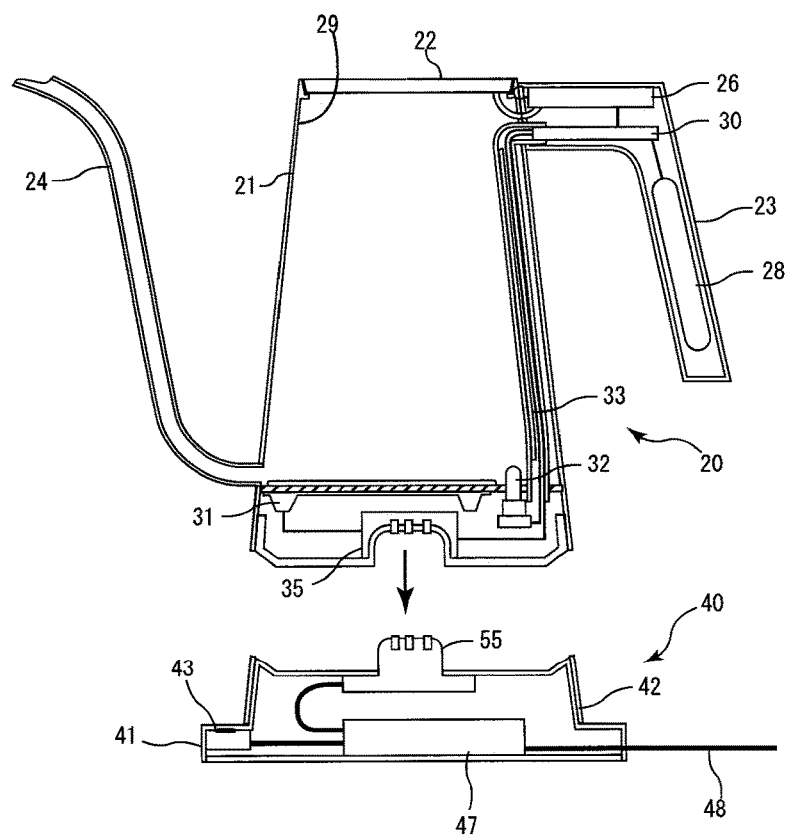
FIG. 2 is a cross-sectional view showing an internal structure of the electric kettle in FIG. 1.

As shown in FIGS. 1 and 2, an electric kettle 10 according to a first embodiment includes a kettle main body 20 and a power supply base 40.

The kettle main body 20 has an exterior case 21 made of stainless steel that has the shape of a truncated cone, a container 29 made of stainless steel that is provided in the exterior case 21, a handle 23 made of resin that has an L-shape and is provided on an upper part of a circumferential surface of the exterior case 21, a nozzle 24 made of stainless steel provided on a lower part of the circumferential surface of the exterior case 21 through which water (hot water) in the container 29 is poured out, and a lid 22 made of resin that is provided to be able to open and close a top opening of the exterior case 21. In this embodiment, a part of the exterior case 21 serves also as a part of the container 29. A kettle main body-side connection part 35 having a recessed shape is provided in a central part of a bottom surface of the exterior case 21. The kettle main body-side connection part 35 is provided with electrode terminals that electrically connect the power supply base 40 and the kettle main body 20 to each other. In this embodiment, the kettle main body-side connection part 35 has a first terminal 35a that electrically connects a temperature detection part of the kettle main body and a second control part 401 of the power supply base to each other, a second terminal 35b that electrically connects a heater 31 of the kettle main body and a second power supply circuit 402 of the power supply base to each other, and a third terminal 35c that connects a charging part of the kettle main body to a utility power supply 60 via the power supply base 40. Data on the temperature of water detected by the temperature detection part 306 is transmitted to the second control part 401 via the first terminal 35a.

The kettle main body 20 further includes the heater 31 for heating water in the container 29, a water amount sensor for detecting the amount of water (water amount) in the container 29, a water temperature sensor for detecting the temperature of water in the container 29, and a first display part 26 that displays information on the water amount detected by the water amount sensor. Note that the temperature detected by the water temperature sensor is referred to as a "current temperature", in order to discriminate the temperature from a "desired temperature" described later. An electrode 33 for the water amount sensor and an electrode 32 for the water temperature sensor are provided on the container 29, for example. The heater 31 is provided on a bottom part of the container 29. A connection terminal of the electrode 33 for the water amount sensor, a connection terminal of the electrode 32 for the water temperature sensor, and a connection terminal of the heater 31 are arranged in a space between the exterior case 21 and the container 29. Cables connected to the connection terminals of the electrodes for the water amount sensor and the water temperature sensor are connected to a first control substrate 30 in the handle 23 through the space between the exterior case 21 and the container 29 or through a wiring pipe for cable routing.

The first display part 26 is provided on an upper surface of a base end part of the handle 23. The handle 23 houses the first control substrate 30 for implementing various functions of the kettle main body 20, and a battery 28 that drives the water amount sensor, the water temperature sensor and the first display part 26. Since the handle 23 houses the battery 28, the battery 28 can be located as far from the container 29, which is a heat source, as possible, and the heat deterioration of the battery 28 can be advantageously reduced. When a dry battery is used as the battery 28, the user can easily replace the battery 28 if the handle 23 is configured to house the battery 28.

The power supply base 40 has a pedestal 41 having a rectangular plate-like shape, and a mount 42 provided at the center of a surface of the pedestal 41. An exterior of the mount 42 is made of the same stainless steel as the exterior case 21 of the kettle main body 20 and has the shape of a truncated cone so that the exterior of the mount 42 is continuous with the exterior case 21. An upper surface of the mount 42 is shaped to fit to the bottom part of the exterior case 21. A power supply base-side connection part 55 having the shape of a protrusion is provided at the center of the upper surface of the mount 42. The power supply base-side connection part 55 has a plurality of terminals 55 (55a, 55b, 55c) to be connected to the plurality of terminals 35 (35a, 35b, 35c) of the kettle main body, respectively. The pedestal 41 houses a second control substrate 47 for implementing various functions of the power supply base. A power supply cable 48 provided with a utility plug to be connected to the utility power supply 60 is connected to the second control substrate 47. On the pedestal 41, there are provided a power supply button 43 for the electric kettle 10, a heating button 44 for boiling water, a temperature setting operation part 45 that receives a user operation concerning temperature setting, and a second display part 46 that displays information concerning temperature. The second display part 46 displays the current temperature of water detected by the water temperature sensor and the desired temperature received by the temperature setting operation part 45. The desired temperature herein may be a temperature during temperature setting or a temperature after temperature setting is completed.

On the first control substrate 30 of the kettle main body, a first control IC is mounted. To the first control IC, the water amount sensor, the water temperature sensor, a first energization determination part 304, a first timer 308, a first power supply circuit 302, and the first display part 26 are connected. In terms of functionality, the first control IC includes a first control part 301 that controls each part connected to the control IC. Various functions of the kettle main body 20 are implemented under control of the first control part 301.

The first power supply circuit 302 uses the electric power supplied from the battery 28 to generate a driving electric power for driving the first control IC (first control part 301), the water amount sensor, the water temperature sensor, a timer IC and the first display part 26. The battery 28 may be charge storage means, such as a rechargeable secondary battery, a lithium ion capacitor or a supercapacitor. The charging part 303 includes a smoothing circuit, a rectifying circuit or the like and charges the battery 28 with the electric power supplied from the utility power supply 60. Note that the battery 28 may be a primary battery, such as a dry battery. In that case, the charging part 303 or the like required for charging the battery 28 is omitted.

The first energization determination part 304 can be any energization sensor. The first energization determination part 304 determines whether a current path between the power supply base 40 and the kettle main body 20 is conductive or not. For example, the first energization determination part 304 has a resistor arranged on a current path in the kettle main body and outputs an energization detection signal to the first control part 301 when a current flowing through the resistor is detected. When the first control part 301 receives the energization detection signal, the first control part 301 determines that the kettle main body 20 is placed on the power supply base 40. When the energization detection signal having been continuously received is lost, the first control part 301 determines that the kettle main body 20 is separated from the power supply base 40.

The water amount sensor can be any capacitance-type sensor. The water amount sensor has a water amount detection electrode unit 33 and a water amount detection part 305. The water amount detection electrode unit 33 includes a ground electrode and a sensor electrode. The water amount detection part 305 detects the amount of the water in the container 29 based on the capacitance between the ground electrode and the sensor electrode, and outputs water amount data on the detected amount of water to the first control part 301.

The temperature sensor can be any water-proof thermistor. The temperature sensor has a temperature detection electrode 32 and a temperature detection part 306. The temperature detection electrode 32 has a resistor. The temperature detection part 306 detects the temperature of the water in the container 29 based on the resistance of the resistor, and outputs temperature data on the detected temperature of water to the first control part 301 and the second control part 401.

A first display driving part 307 drives the first display part 26 with the electric power supplied from the first power supply circuit 302 under the control of the first control part 301. The first display part 26 is driven by the first display driving part 307 and changes the display thereof under the control of the first control part 301.

The first timer 308 can be a timer IC. The first timer 308 is activated under the control of the first control part 301, and measures a previously set time, such as a heat retention time, a display retention time and a waiting time herein. When the measurement of a set time is completed, the first timer 308 outputs a measurement completion signal to the first control part 301. The heat retention time, the display retention time and the waiting time are typically preset. However, these times can be arbitrarily changed by the user. For example, the temperature setting operation part 45 may receive a time setting operation from the user under the control of the second control part 401, or another operation part for receiving a time setting operation may be provided in one of the kettle main body 20 and the power supply base 40. The time set on the operation part provided in the kettle main body 20 or the power supply base 40 may be transmitted between the first control part 301 and the second control part 401. To this end, the first control part 301 and the second control part 401 can be electrically connected to each other via the terminals 35a and 55a, while the temperature detection part 306 and the second control part 401 are electrically connected to each other via the terminals 35a and 55a in the first embodiment.

The first control part 301 receives the water amount data from the water amount detection part 305, the temperature data from the temperature detection part 306, the energization detection signal from the first energization determination part 304, and the measurement completion signal from the first timer 308. Based on the input data from these parts, the first control part 301 controls the display of the first display part 26. The control of the display of the first display part 26 by the first control part 301 will be described in detail later.

A second control IC is mounted on the second control substrate 47 of the power supply base. To the second control IC, the heating button 44, the temperature setting operation part 45, a second energization determination part 404, a second timer 408, the second power supply circuit 402, a third power supply circuit 403, and the second display part 46 are connected, for example. In terms of functionality, the second control IC includes a second control part 401 that controls each part connected to the second control IC.

Various functions of the power supply base 40 are implemented under control of the second control part 401.

The second power supply circuit 402 is directly connected to the utility power supply 60, and uses the electric power supplied from the utility power supply 60 to generate a driving electric power for the heater 31 under the control of the second control part 401. The power supply button 43 is connected to the third power supply circuit 403. When the power supply button 43 is pressed, the third power supply circuit 403 is electrically connected to the utility power supply 60, and uses the electric power supplied from the utility power supply 60 to generate a driving electric power for driving the second control part 401, the second timer 408, the heating button 44 and the second display part 46.

The temperature setting operation part 45 receives a user operation concerning the desired temperature under the control of the second control part 401. An operation of setting the desired temperature will be described in detail later. The temperature setting operation part 45 separately receives an integral part and a decimal part of the desired temperature under the control of the second control part 401.

The heating button 44 can be a touch sensor. The heating button 44 is a shortcut button for setting the desired temperature at 100° C. When the heating button 44 is touched, a signal indicating that the heating button 44 is operated is input to the second control part 401. When it is detected that the heating button 44 is operated, the second control part 401 sets the desired temperature at 100° C., controls the second power supply circuit 402 to start heating of the heater 31, and controls the second display driving part 407 to make the second display part 46 display the desired temperature.

The second energization determination part 404 determines whether a current path between the power supply base 40 and the kettle main body 20 is conductive or not. For example, the second energization determination part 404 has a resistor arranged on a current path in the power supply base and outputs an energization detection signal to the second control part 401 when a current flowing through the resistor is detected. When the second control part 401 receives the energization detection signal, the second control part 401 determines that the kettle main body 20 is placed on the power supply base 40. When the energization detection signal having been continuously received is lost, the second control part 401 determines that the kettle main body 20 is separated from the power supply base 40.

The second display driving part 407 drives the second display part 46 with the electric power supplied from the third power supply circuit 403 under the control of the second control part 401. The second display part 46 is driven by the second display driving part 407 and changes the display thereof under the control of the second control part 401.

The second timer 408 can be a timer IC. The second timer 408 is activated under the control of the second control part 401, and measures a previously set time, such as the heat retention time, the display retention time and the waiting time herein. When the measurement of a set time is completed, the second timer 408 outputs a measurement completion signal to the second control part 401.

The second control part 401 receives the temperature data from the temperature detection part 306 of the kettle main body, the energization detection signal from the second energization determination part 404, and the measurement completion signal from the second timer 408. Based on the input data from these parts, the second control part 401 performs a driving control process for the heater 31 and a display control process for the second display part 46. The driving control process for the heater 31 and the display control process for the second display part 46 by the second control part 401 will be described in detail later.

(Description of First Display Part 26 and Second Display Part 46)

The electric kettle 10 according to this embodiment is characterized in that both the kettle main body 20 and the power supply base 40 are provided with a display part. In the following, with reference to FIGS. 3 and 4, the first display part 26 of the kettle main body and the second display part 46 of the power supply base will be described. In the description of the second display part 46, a temperature setting operation by the temperature setting operation part 45 will also be described.

Figure 3:
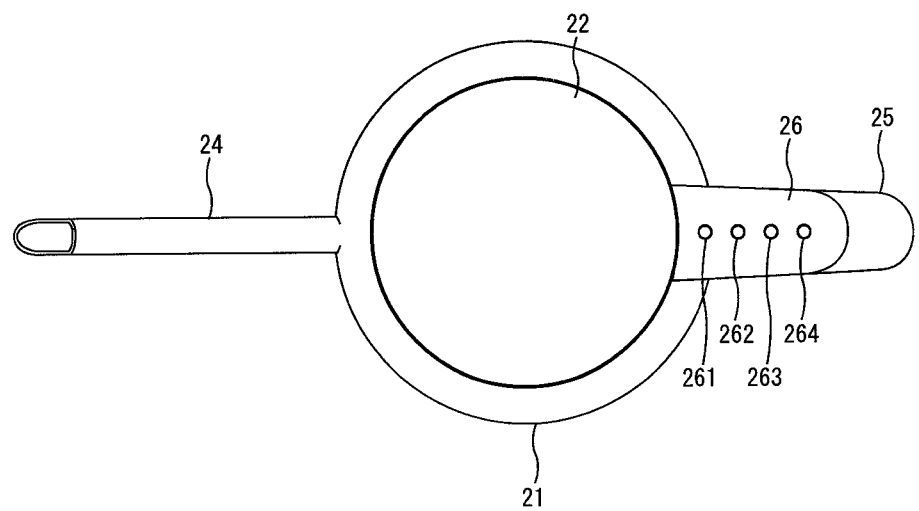
FIG. 3 is a diagram showing a display part of a kettle main body of the electric kettle in FIG. 1.

As shown in FIG. 3, the first display part 26 can use a plurality of LEDs, such as four LEDs 261, 262, 263 and 264. The four LEDs 261, 262, 263 and 264 are arranged on the handle 23 in a row at regular intervals from the base end toward the tip end of the handle 23. The four LEDs 261, 262, 263 and 264 are turned on depending on the amount of the water in the container 29. For example, depending on the water amount, the four LEDs 261, 262, 263 and 264 are sequentially turned on, starting with the LED 264 closest to the tip end of the handle 23. The water amount is classified into five amount ranges, such as extremely small amount, small amount, moderate amount, large amount, and maximum amount, for example. When the water amount is extremely small, none of the four LEDs 261, 262, 263 and 264 is turned on. When the water amount is small, only the LED 264 closest to the tip end of the handle 23 is turned on. When the water amount is moderate, the LED 264 closest to the tip end of the handle 23 and the LED 263 next to the LED 264 are turned on. When the water amount is maximum, all of the four LEDs 261, 262, 263 and 264 are turned on. The first control part 301 checks in which range the water amount falls based on the water amount data, and controls the first display driving part 307 to control the turning on of the four LEDs according to the range. For example, the five ranges depend on the number of cups of coffee. Specifically, the extremely small amount corresponds to a cup of coffee (such as 160 cc), the small amount corresponds to two cups of coffee, the moderate amount corresponds to three cups of coffee, the large amount corresponds to four cups of coffee, and the maximum amount corresponds to five cups of coffee.

Figure 4:
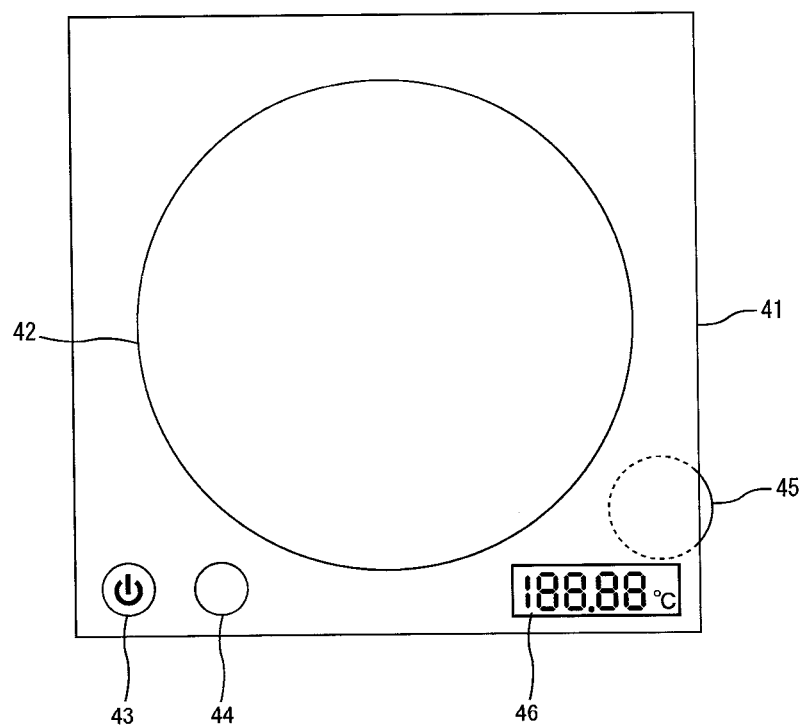
FIG. 4 is a diagram showing a display part of a power supply base of the electric kettle in FIG. 1.
Figure 5:
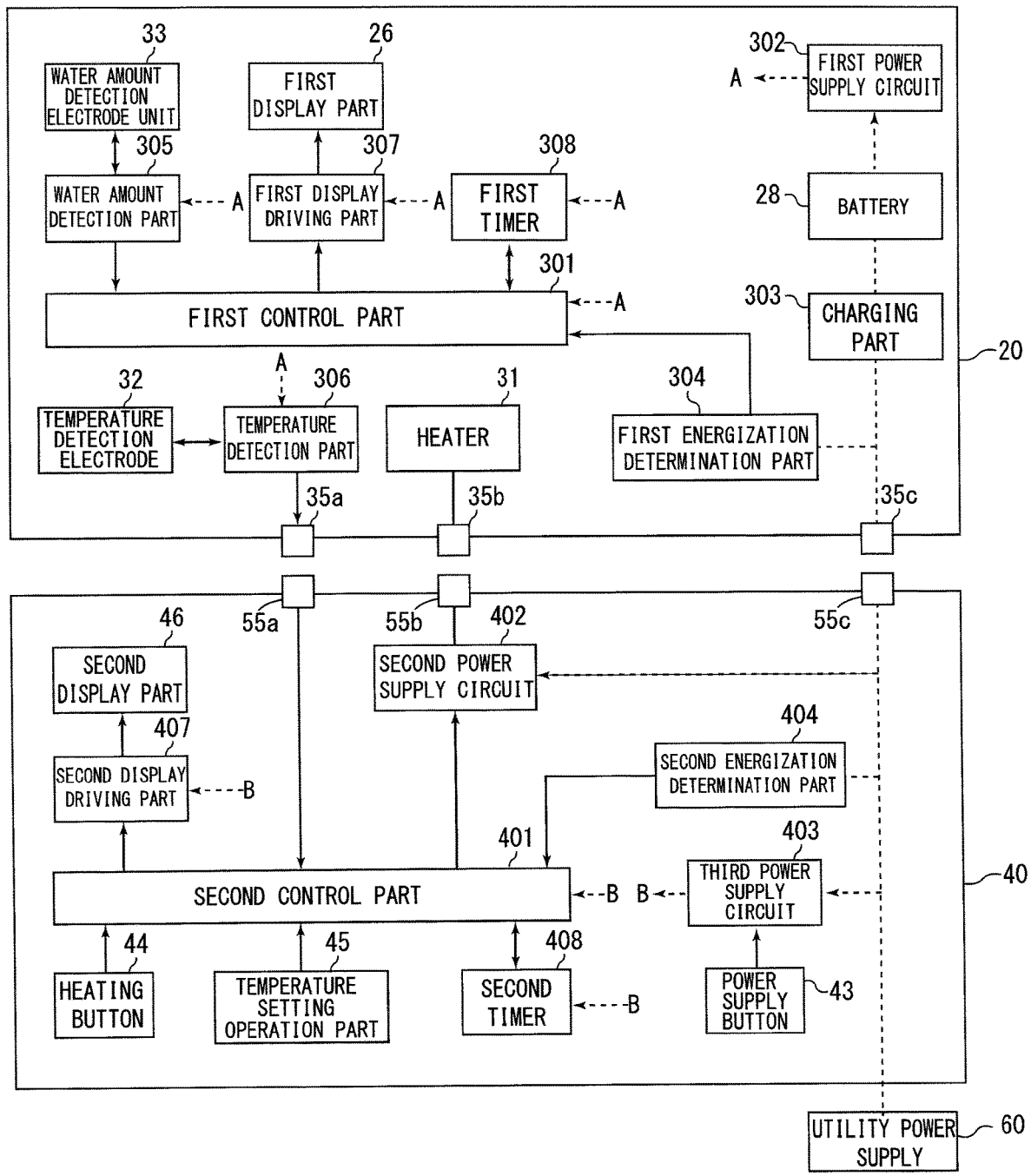
FIG. 5 is a functional block diagram showing the electric kettle in FIG. 1.

As shown in FIG. 4, the second display part 46 is formed by a combination of three 7-segment displays for three digits of the integral part and two 7-segment displays for two digits of the decimal part. The second display part 46 displays the current temperature and the desired temperature ranging from 0° C. to 100° C. in steps of 0.01° C.

The temperature setting operation part 45 can be a wheel button. In temperature setting, the specification of the integral part and the specification of the decimal part are separately received. Therefore, compared with a case where the desired temperature can be raised or lowered only in steps of 0.01° C., the desired temperature can be quickly set. For example, by pressing and holding the operation part 45, a temperature setting mode is set to an integral mode under the control of the second control part 401. In the integral mode, the temperature can be raised or lowered in steps of 1° C. When the operation part 45 is pressed in the integral mode, the second control part 401 establishes the setting of the integral part of the desired temperature and switches the temperature setting mode from the integral mode to a decimal mode. In the decimal mode, the temperature can be raised or lowered in steps of 0.01° C. When the operation part 45 is pressed in the decimal mode, the second control part 401 establishes the setting of the decimal part of the desired temperature. In this setting operation, the temperature can be quickly set. While the temperature is set in two steps of the integral part and the decimal part in the example of the setting operation described above, of course, finer specifications of the desired temperature may be received. For example, the specifications of the ten's place and the one's place of the integral part may be separately received, or the specifications of the first decimal place and the second decimal place of the decimal part may be separately received.

Figure 6:
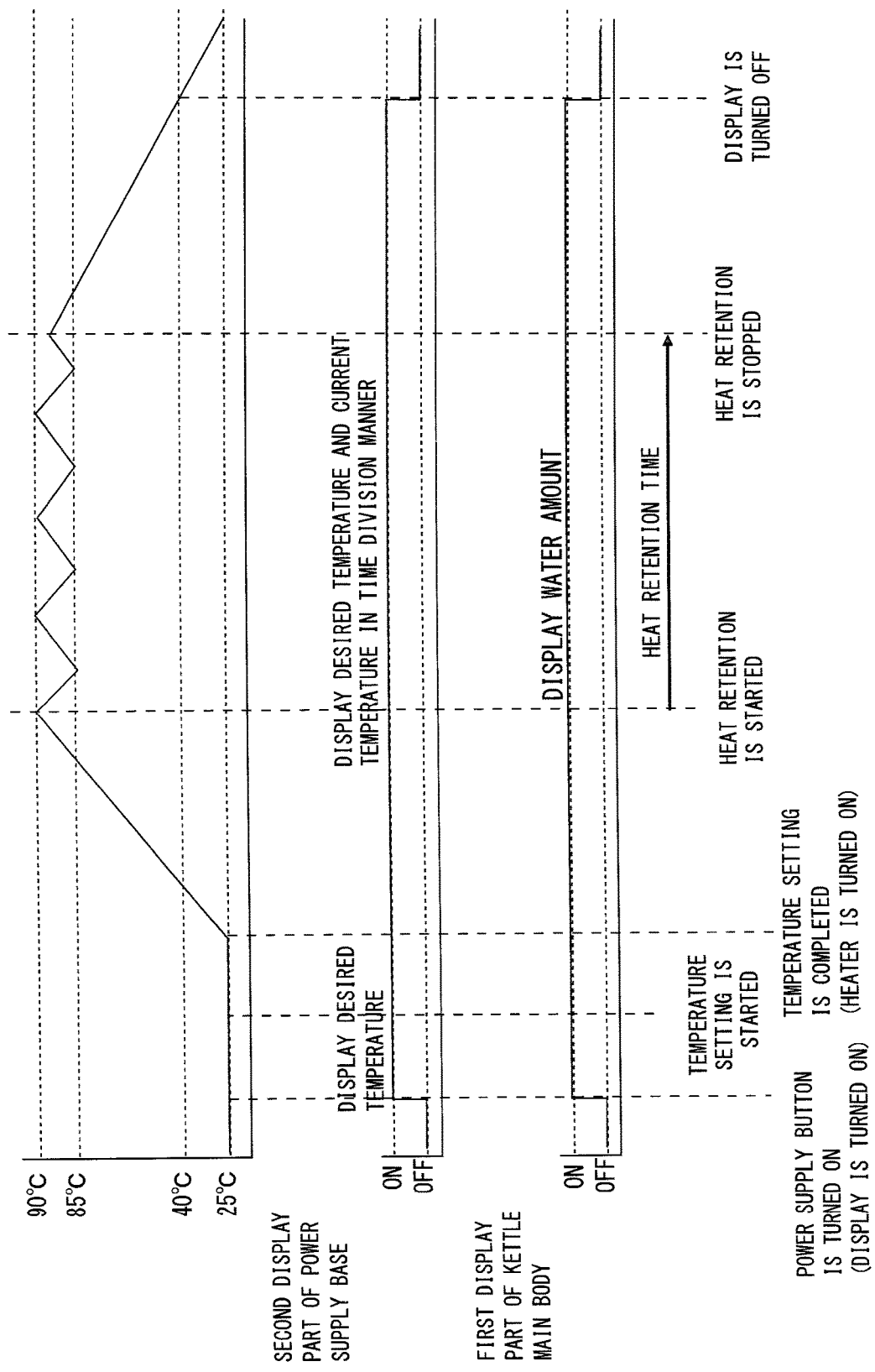
FIG. 6 is a diagram showing an example of a display transition in a state where the kettle main body is placed on the power supply base according to the first embodiment.

In the following, a driving control for the heater 31 by the control part will be described with reference to FIG. 6. As shown in FIG. 6, when the first control part 301 determines that the temperature setting operation is completed based on an input from the temperature setting operation part 45, the first control part 301 controls the second power supply circuit 402 to drive the heater 31 to start heating the water in the container 29. In this way, the water in the container 29 is heated. When the current temperature reaches the desired temperature, the first control part 301 controls the second power supply circuit 402 to stop heating of the water and stops driving of the heater 31. Once the current temperature has reached the desired temperature, the first control part 301 controls the second power supply circuit 402 in a heat retention mode. In the heat retention mode, the first control part 301 controls the second power supply circuit 402 to resume heating the water when the current temperature falls to a predetermined threshold (referred to as a heat retention temperature, hereinafter) and stop heating the water again when the current temperature reaches the desired temperature again. In the heat retention mode, the start of heating and the stop of heating are repeated in this way to keep the temperature of the water equal to or higher than the heat retention temperature. The heat retention mode continues for the heat retention time, such as 15 minutes, from the time when the temperature of the water reaches the desired temperature for the first time. When the heat retention time has elapsed since the temperature of the water reached the desired temperature for the first time, the heat retention mode ends, the heating of the water is stopped, and the water in the container 29 cools down.

In the following, with reference to FIG. 6, a display control for the first display part 26 by the first control part 301 and a display control for the second display part 46 by the second control part 401 will be described. The first display part 26 and the second display part 46 are switched from an on state to an off state based on the current temperature detected by the water temperature sensor.

As shown in FIG. 6, the on state of the first display part 26 is maintained from the time when the current temperature reaches the desired temperature to the time when the current temperature falls to a predetermined threshold (referred to as a safety temperature, hereinafter). Specifically, when the power supply button 43 is turned on, the first control part 301 controls the first display driving part 307 to turn on the first display part 26 in the manner depending on the water amount detected by the water amount sensor. After the current temperature reaches the desired temperature, when the current temperature falls to the safety temperature, the first control part 301 controls the first display driving part 307 to set the first display part 26 to the off state.

Similarly, after the current temperature reaches the desired temperature, the on state of the second display part 46 is maintained until the current temperature falls to the safety temperature. Specifically, when the power supply button 43 is turned on, the second control part 401 controls the second display driving part 407 to make the second display part 46 display the previous desired temperature. During the period from the time when the temperature setting operation is started to the time when the temperature setting operation is ended, the second control part 401 controls the second display driving part 407 to make the second display part 46 display the temperature being set based on the input from the temperature setting operation part 45. When the temperature setting operation is completed, the second control part 401 controls the second display driving part 407 to make the second display part 46 display the current temperature and the desired temperature in a time division manner. When the current temperature falls to the safety temperature, the second control part 401 controls the second display driving part 407 to set the second display part 46 to the off state.

In response to the kettle main body 20 being separated from the power supply base 40, the display mode of the second display part 46 is changed. In addition, in response to the kettle main body 20 being separated from the power supply base 40, the timing of switching of the first display part 26 and the second display part 46 from the on state to the off state is changed. Specifically, the first display part 26 and the second display part 46 are set to the off state based on the elapsed time since a separation of the kettle main body 20 from the power supply base 40. The display mode of the second display part 46 is switched from a mode in which the current temperature and the desired temperature are displayed in a time division manner to a timer mode in which the elapsed time from a predetermined point in time is displayed.

Figure 7:
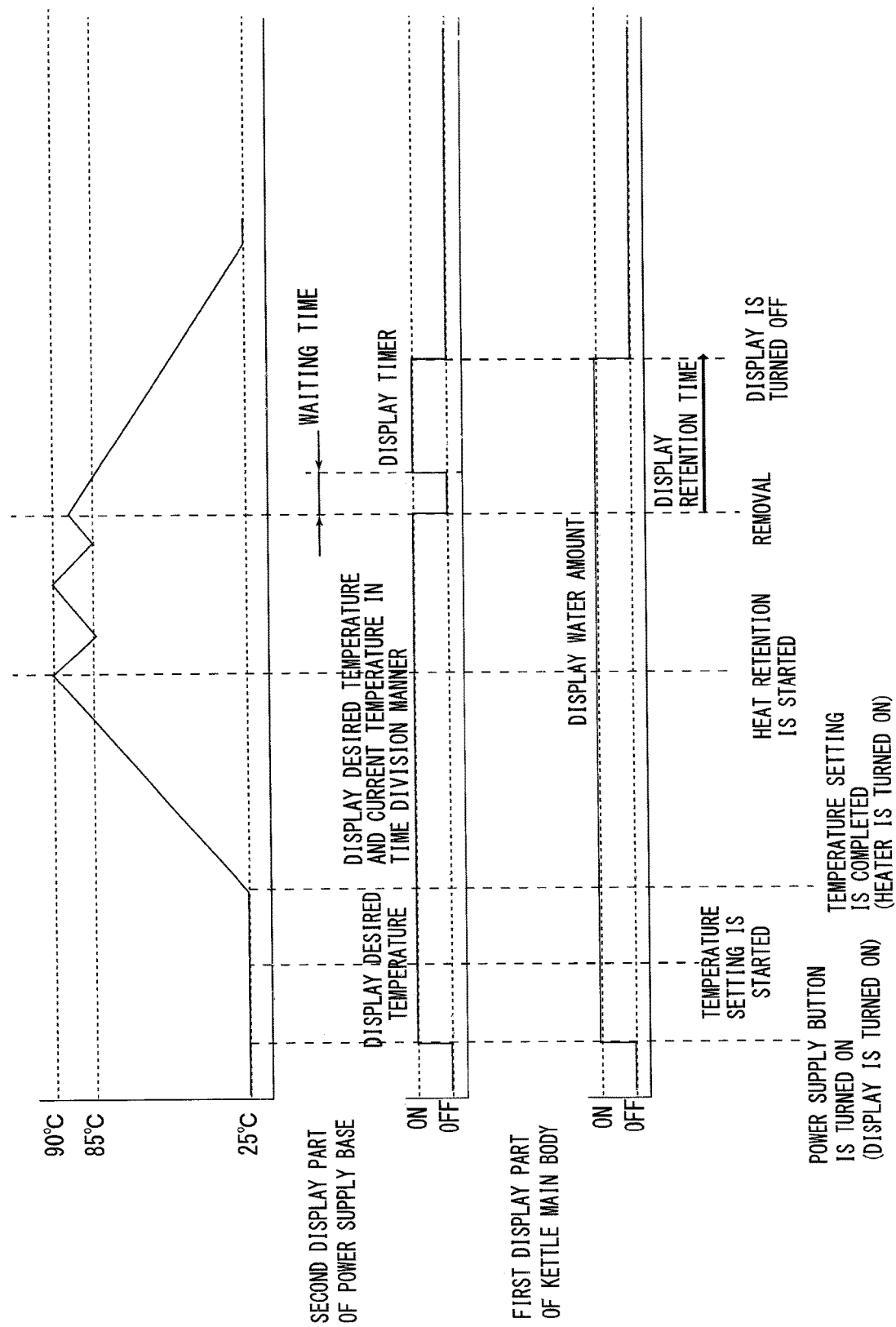
FIG. 7 is a diagram showing an example of a display transition in a state where the kettle main body is separated from the power supply base according to the first embodiment.

As shown in FIG. 7, when the kettle main body 20 is separated from the power supply base 40, the second control part 401 controls the second display driving part 407 to set the second display part 46 to the off state. The off state of the second display part 46 is maintained for an arbitrary waiting time (such as 5 seconds). Once the waiting time has elapsed since the kettle main body 20 is separated from the power supply base 40, the second control part 401 controls the second display driving part 407 to make the second display part 46 display the elapsed time from that point in time, that is, the elapsed time from the point in time when the waiting time elapses since the kettle main body 20 is separated from the power supply base 40. When a predetermined display retention time has elapsed since the kettle main body 20 is separated from the power supply base 40, the second control part 401 controls the second display driving part 407 to set the second display part 46 to the off state. As shown in FIG. 7, the display mode of the first display part 26 is not changed even if the kettle main body 20 is separated from the power supply base 40. The first control part 301 controls the first display driving part 307 to set the first display part 26 to the off state when a predetermined display retention time has elapsed since the kettle main body 20 is separated from the power supply base 40. Note that the first control part 301 and the second control part 401 may control the first display driving part 307 and the second display driving part 407 to set the first display part 26 and the second display part 46, respectively, when a predetermined display retention time has elapsed since the current temperature reached the desired temperature for the first time.

With the electric kettle 10 according to the first embodiment described above, the user can check the amount of the hot water on the first display part 26 of the kettle main body, and check the current temperature and the desired temperature of the hot water on the second display part 46 of the power supply base. Furthermore, since the battery 28 is incorporated in the kettle main body 20, the display of the first display part 26 of the kettle main body can be maintained before and after the kettle main body 20 is separated from the power supply base 40. Once the waiting time has elapsed since the kettle main body 20 is separated from the power supply base 40, the second display part 46 of the power supply base 40 displays the elapsed time from that point in time. The user can remove the kettle main body 20 from the power supply base 40, make a preparation for pouring hot water into a dripper with coffee powder inside during the waiting time described above, and actually pour hot water into the dripper at the timing when the display mode of the second display part 46 of the power supply base 40 is switched from the temperature display mode to the timer display mode. In this way, the user can perform a series of steps for brewing coffee by managing the time to pour hot water, the duration of steaming of coffee powder after pouring of the hot water, and the time to pour hot water to the steamed coffee powder to brew coffee. The first display part 26 and the second display part 46 are automatically turned off when the current temperature falls to the safety temperature after the heat retention mode ends or when a predetermined time has elapsed since the kettle main body 20 is separated from the power supply base 40. Therefore, the power consumption can be reduced. In addition, since the displays are turned off when the current temperature falls to the safety temperature, the risk of the user being burnt when discharging the water from the container 29 can be reduced.

Second Embodiment

In the electric kettle 10 according to the first embodiment, the second display part 46 of the power supply base doubles as a display part that displays the current temperature and a display part that displays the desired temperature. However, a display part that displays the current temperature and a display part that displays the desired temperature may be separately provided.

Figure 8:
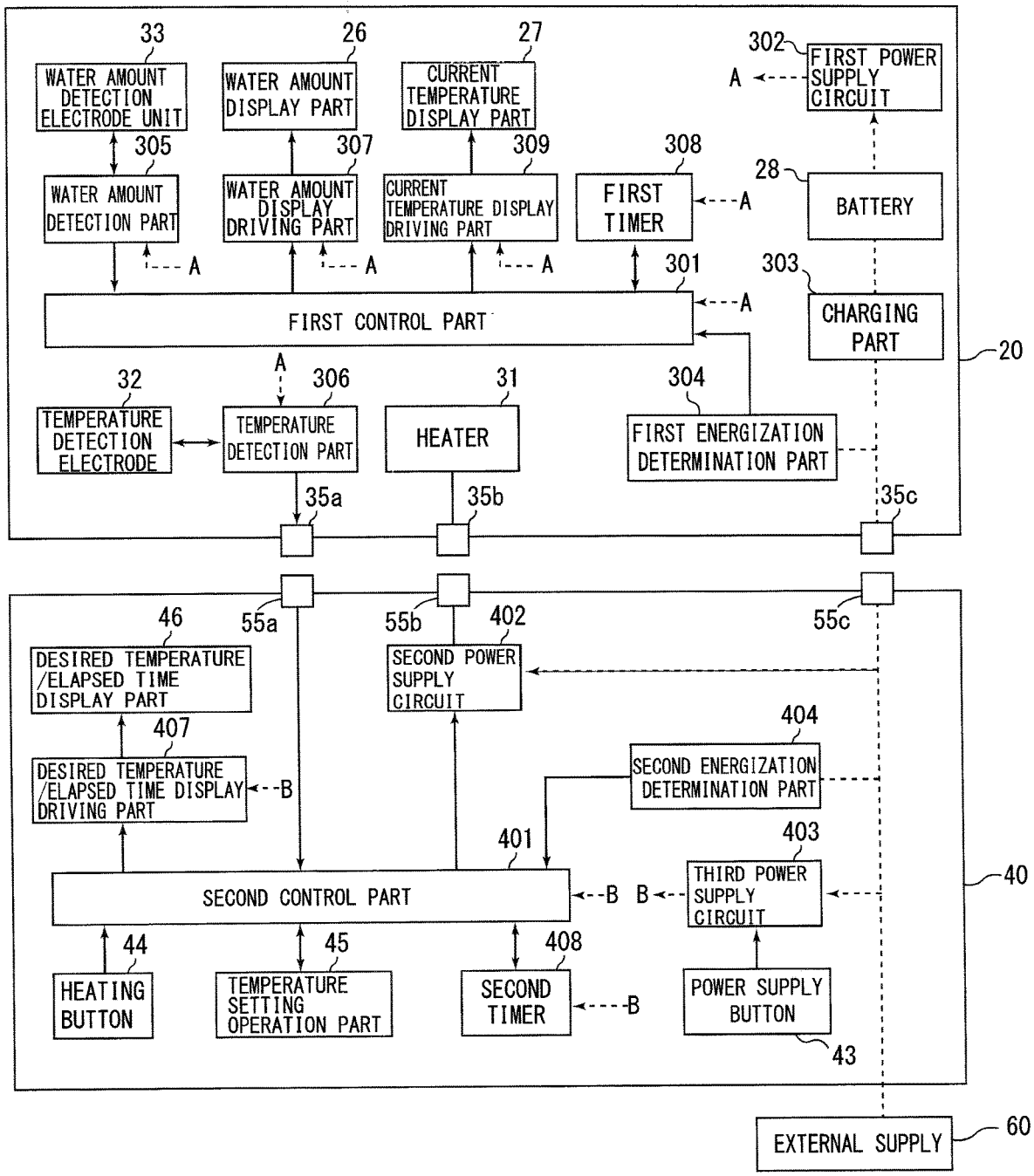
FIG. 8 is a functional block diagram showing an electric kettle according to a second embodiment.
Figure 9:
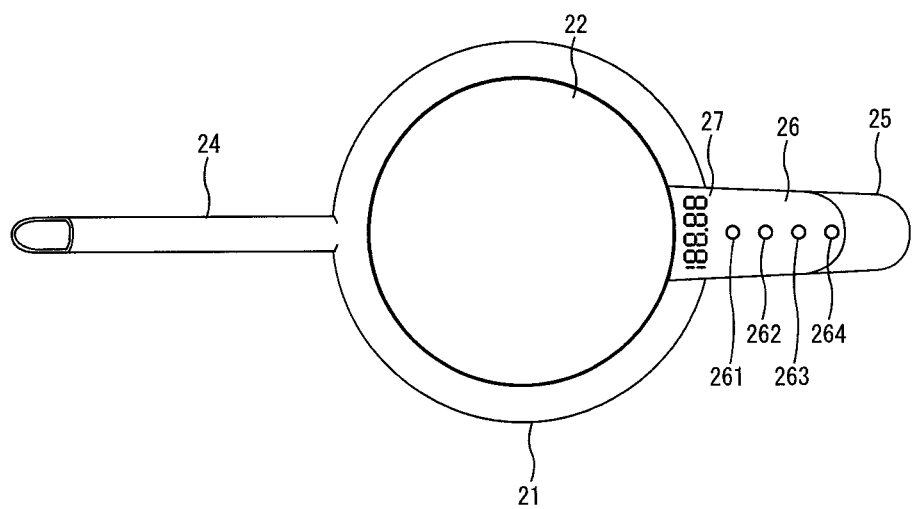
FIG. 9 is a diagram showing display parts of the kettle main body of the electric kettle in FIG. 8.

In the following, the electric kettle 10 according to a second embodiment will be described with reference to FIGS. 8, 9, 10, and 11. As shown in FIGS. 8 and 9, the kettle main body 20 of the electric kettle 10 according to the second embodiment is provided with another display part in addition to the existing first display part 26. The additional display part displays the current temperature, which is displayed on the second display part 46 of the power supply base in the first embodiment. In the following, of the two display parts of the kettle main body, the existing first display part 26 that displays information on the water amount detected by the water amount sensor will be referred to as a water amount display part 26, and the additional display part according to the second embodiment that displays the current temperature detected by the water temperature sensor will be referred to as a current temperature display part 27. The display part of the power supply base will be referred to as a desired temperature/elapsed time display part 46.

As shown in FIG. 9, the current temperature display part 27 is arranged adjacent to the water amount display part 26. As with the desired temperature/elapsed time display part 46 of the power supply base, the current temperature display part 27 is formed by a combination of three 7-segment displays for three digits of the integral part and two 7-segment displays for two digits of the decimal part, in order to display the current temperature ranging from 0° C. to 100° C. in steps of 0.01° C.

As shown in FIG. 8, a structural difference between the electric kettle 10 according to the second embodiment and the electric kettle 10 according to the first embodiment is that the kettle main body of the electric kettle 10 according to the second embodiment includes the current temperature display part 27 and a current temperature display driving part 309 that drives the current temperature display part 27 under the control of the second control part 401. Therefore, the components of the electric kettle 10 according to the second embodiment are the same as those of the electric kettle 10 according to the first embodiment, so that descriptions thereof will be omitted.

In the following, with reference to FIG. 10, a display control for the water amount display part 26 and the current temperature display part 27 by the first control part 301 and a display control for the desired temperature/elapsed time display part 46 by the second control part 401 will be described. In the state where the kettle main body 20 is placed on the power supply base 40, the water amount display part 26, the current temperature display part 27 and the desired temperature/elapsed time display part 46 switched from the on state to the off state based on the elapsed time from the point in time when the current temperature reaches the desired temperature.

Figure 10:
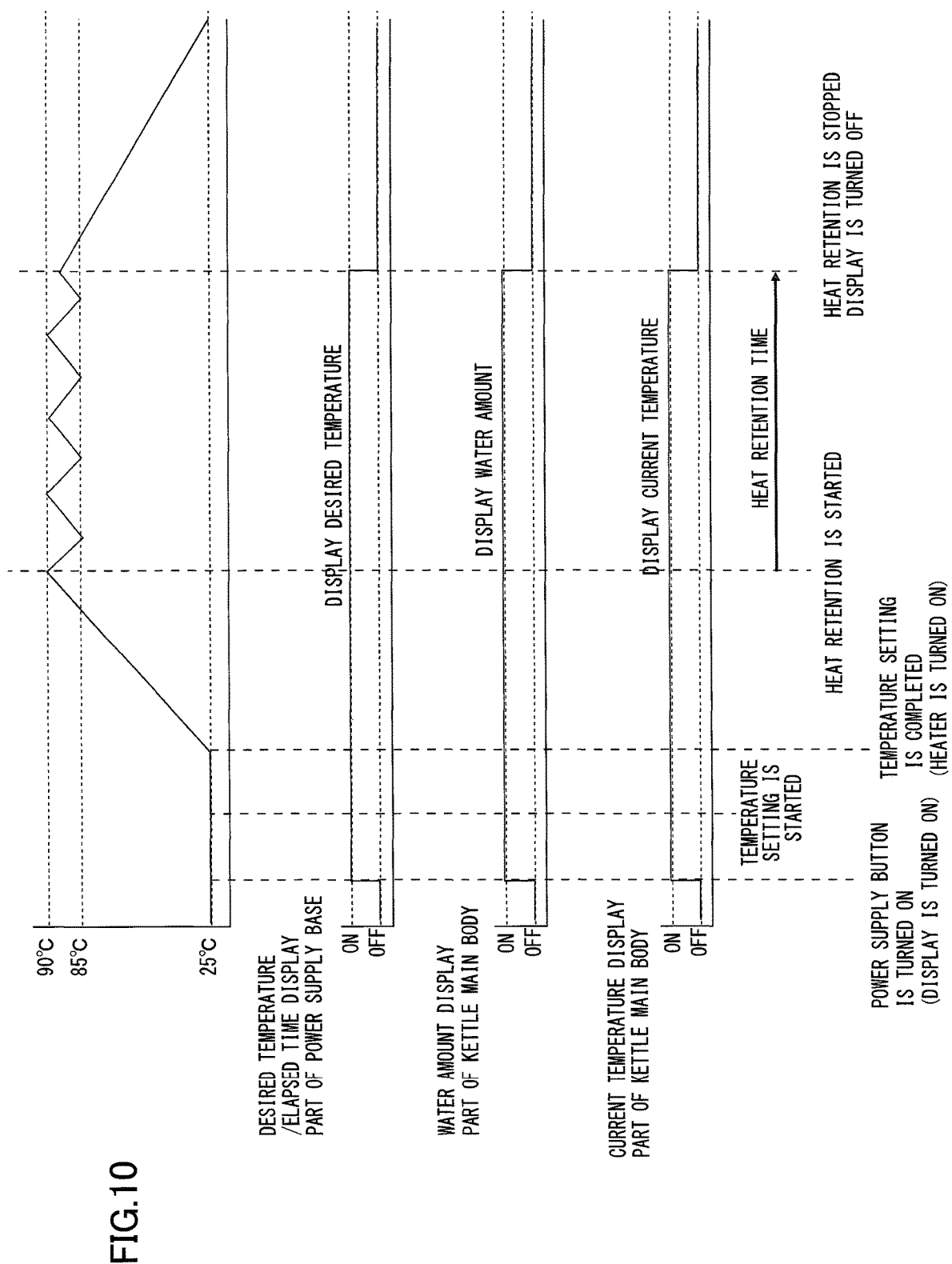
FIG. 10 is a diagram showing an example of a display transition in a state where the kettle main body is placed on the power supply base according to the second embodiment.

As shown in FIG. 10, when the power supply button 43 is turned on, the first control part 301 controls the water amount display driving part 307 to turn on the water amount display part 26 in the manner depending on the water amount detected by the water amount sensor, and controls the current temperature display driving part 309 to make the current temperature display part 27 display the current temperature detected by the water temperature sensor. When a predetermined time, 15 minutes according to the heat retention time in this example, has elapsed since the current temperature reaches the desired temperature, the first control part 301 controls the water amount display driving part 307 to set the water amount display part 26 to the off state, and controls the current temperature display driving part 309 to set the current temperature display part 27 to the off state.

Similarly, when the power supply button 43 is turned on, the second display part 46 controls the desired temperature/elapsed time display driving part 407 to make the desired temperature/elapsed time display part 46 display the previous desired temperature. During the period from the time when the temperature setting operation is started to the time when the temperature setting operation is ended, the second control part 401 controls the desired temperature/elapsed time display driving part 407 to make the desired temperature/elapsed time display part 46 display the temperature being set based on the input from the temperature setting operation part 45. When the temperature setting operation is completed, the second control part 401 controls the desired temperature/elapsed time display driving part 407 to make the desired temperature/elapsed time display part 46 display the desired temperature. When a predetermined time, 15 minutes in this example according to the retention time of the heat retention mode, has elapsed since the current temperature reaches the desired temperature, the second control part 401 controls the desired temperature/elapsed time display driving part 407 to set the desired temperature/elapsed time display part 46 to the off state.

Figure 11:
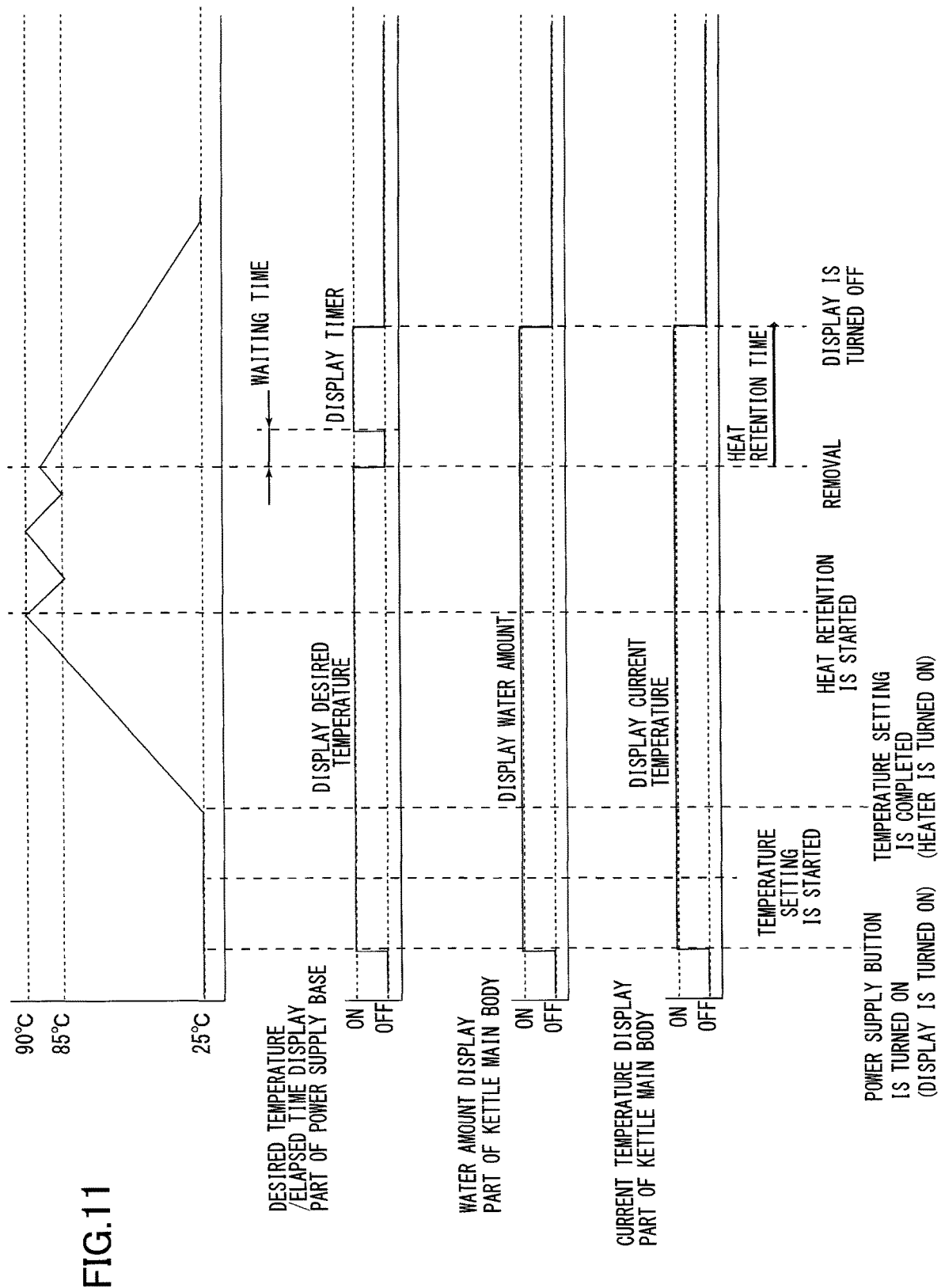
FIG. 11 is a diagram showing an example of a display transition in a state where the kettle main body is separated from the power supply base according to the second embodiment.

In response to the kettle main body 20 being separated from the power supply base 40, the display mode of the desired temperature/elapsed time display part 46 is changed, and the timing of switching of the water amount display part 26, the current temperature display part 27 and the desired temperature/elapsed time display part 46 from the on state to the off state is changed. Specifically, the water amount display part 26, the current temperature display part 27 and the desired temperature/elapsed time display part 46 are set to the off state when a predetermined display retention time has elapsed since the kettle main body 20 is separated from the power supply base 40. The display mode of the desired temperature/elapsed time display part 46 is switched from a mode in which the desired is displayed to a mode in which the elapsed time from a predetermined point in time is displayed. As shown in FIG. 11, the display mode of the water amount display part 26 and the display mode of the current temperature display part 27 are not changed even if the kettle main body 20 is separated from the power supply base 40.

As shown in FIG. 11, when the kettle main body 20 is separated from the power supply base 40, the second control part 401 controls the desired temperature/elapsed time display driving part 407 to set the desired temperature/elapsed time display part 46 to the off state. The off state of the desired temperature/elapsed time display part 46 is maintained for an arbitrary waiting time (such as 5 seconds). Once the waiting time has elapsed since the kettle main body 20 is separated from the power supply base 40, the second control part 401 controls the desired temperature/elapsed time display driving part 407 to make the desired temperature/elapsed time display part 46 display the elapsed time from that point in time, that is, the elapsed time from the point in time when the waiting time elapses since the kettle main body 20 is separated from the power supply base 40. When a predetermined display retention time has elapsed since the kettle main body 20 is separated from the power supply base 40, the second control part 401 controls the desired temperature/elapsed time display driving part 407 to set the desired temperature/elapsed time display part 46 to the off state.

With the electric kettle 10 according to the second embodiment described above, the same advantages as those of the electric kettle 10 according to the first embodiment can be provided. According to the second embodiment, in addition, since the display part that displays the current temperature and the display part that displays the desired temperature are separately provided, the user can be prevented from mixing up the current temperature and the desired temperature. Furthermore, when the kettle main body 20 is removed, the user can check the current temperature on the display part of the kettle main body 20 in their hand, rather than on the display part of the power supply base 40.

Third Embodiment

Figure 12:
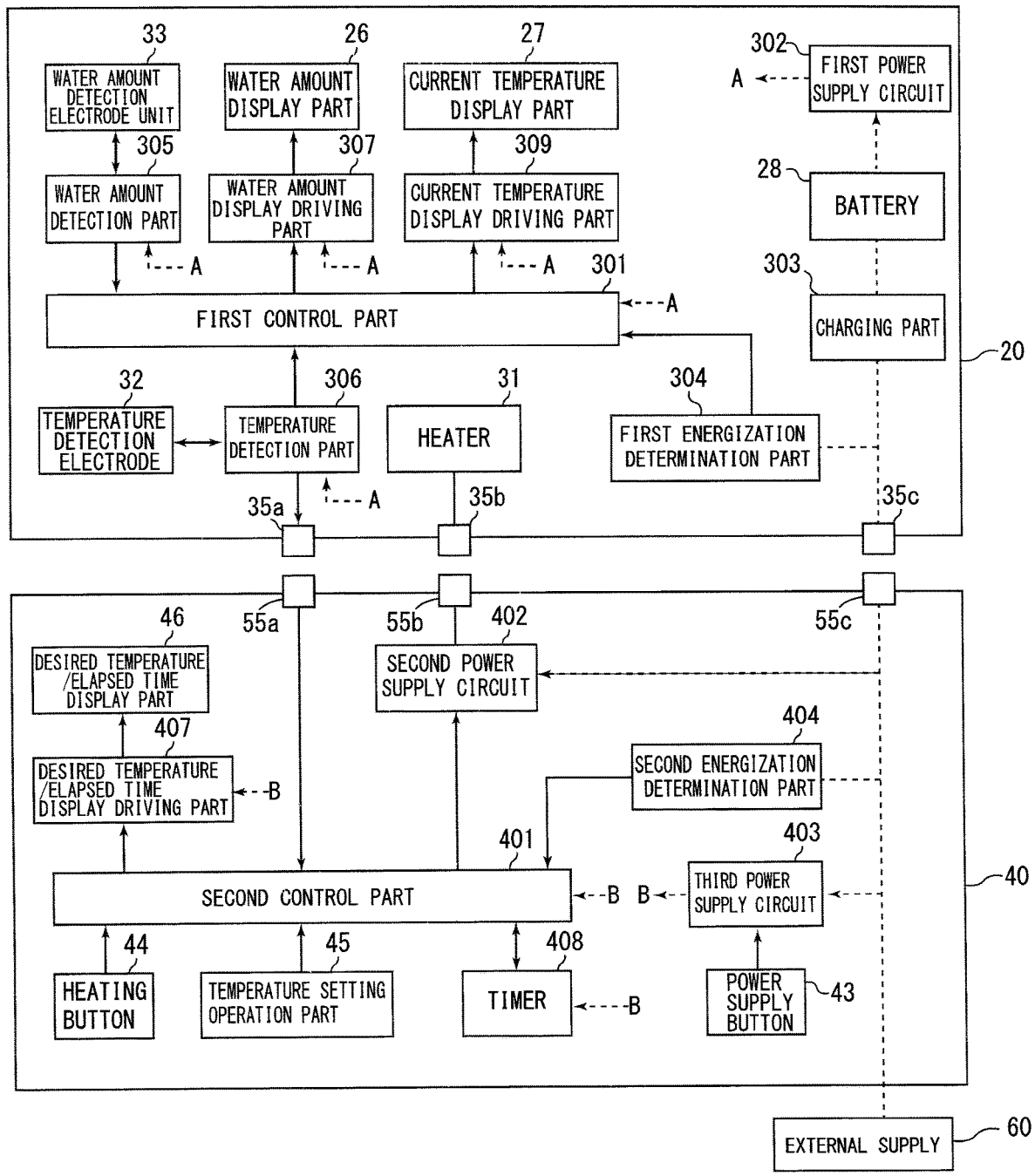
FIG. 12 is a functional block diagram showing an electric kettle according to a third embodiment.

With the electric kettle 10 according to the second embodiment, the water amount display part 26 and the current temperature display part 27 of the kettle main body are set to the off state based on the elapsed time since the kettle main body 20 is separated from the power supply base 40 or the elapsed time from the point in time when the current temperature of the water reaches the desired temperature. However, the water amount display part 26 and the current temperature display part 27 of the kettle main body may be turned off when the current temperature of the water having reached the desired temperature falls to the safety temperature. In the following, the electric kettle 10 according to the third embodiment will be described with reference to FIGS. 12, 13 and 14. As shown in FIG. 12, the only structural difference between the electric kettle 10 according to the third embodiment and the electric kettle 10 according to the second embodiment is that the kettle main body 20 of the electric kettle 10 according to the third embodiment includes no timer. Therefore, the components of the electric kettle 10 according to the third embodiment are the same as those of the electric kettle 10 according to the second embodiment, so that descriptions thereof will be omitted.

Figure 13:
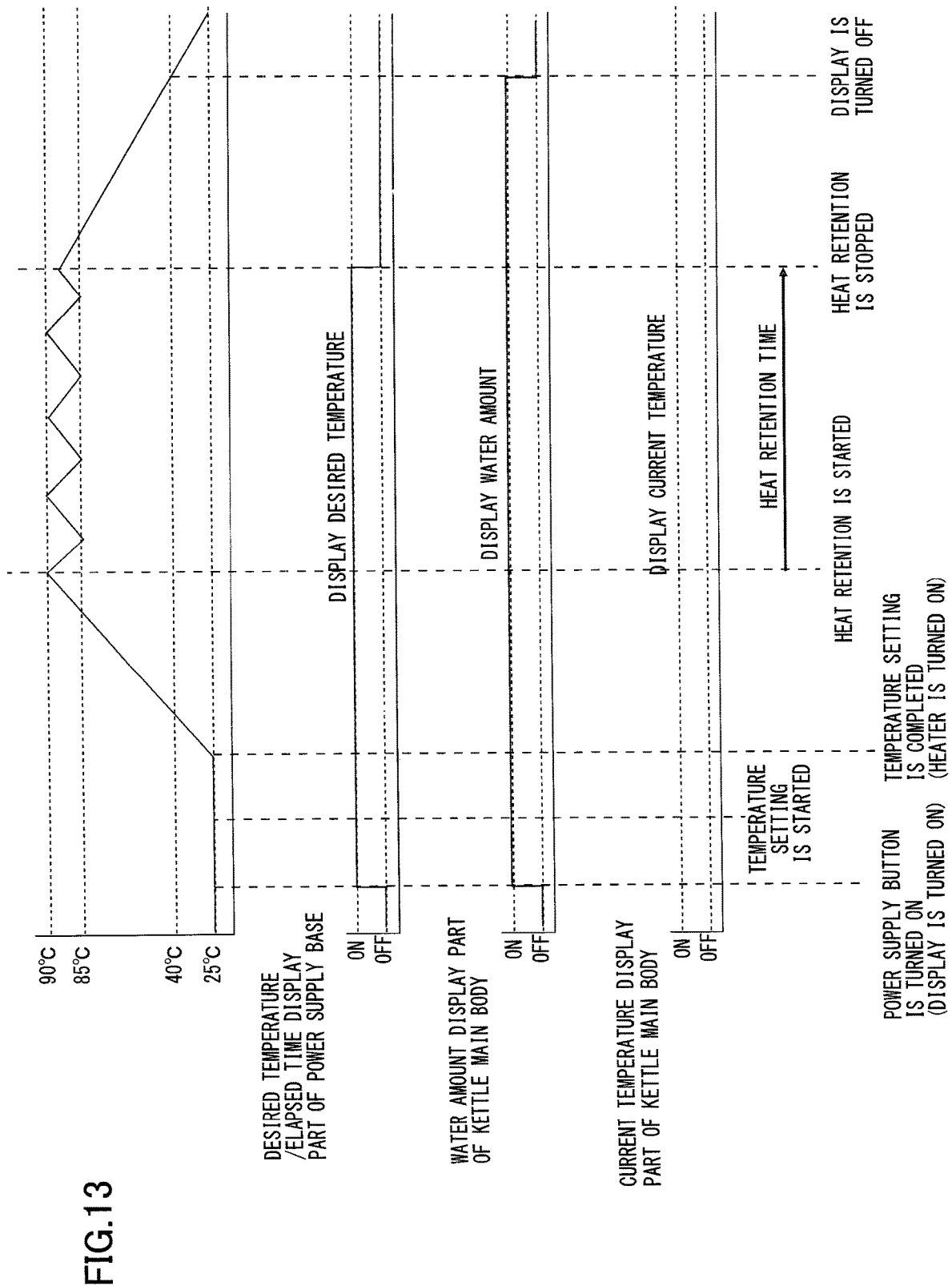
FIG. 13 is a diagram showing an example of a display transition in a state where the kettle main body is placed on the power supply base according to the third embodiment.

In the following, with reference to FIG. 13, a display control for the water amount display part 26 and the current temperature display part 27 by the first control part 301 and a display control for the desired temperature/elapsed time display part 46 by the second control part 401 will be described. The following description will be mainly focused on differences from the second embodiment. As shown in FIG. 13, the timing when the water amount display part 26 and the current temperature display part 27 are set to the off state is different from the timing when the desired temperature/elapsed time display part 46 is set to the off state.

Specifically, when the current temperature having reached the desired temperature falls to the safety temperature, the first control part 301 controls the water amount display driving part 307 to set the water amount display part 26 to the off state and controls the current temperature display driving part 309 to set the current temperature display part 27 to the off state. On the other hand, the second display part 46 controls the desired temperature/elapsed time display driving part 407 to set the desired temperature/elapsed time display part 46 to the off state when a predetermined time, 15 minutes according to the heat retention time in this example, has elapsed since the current temperature reaches the desired temperature.

Figure 14:
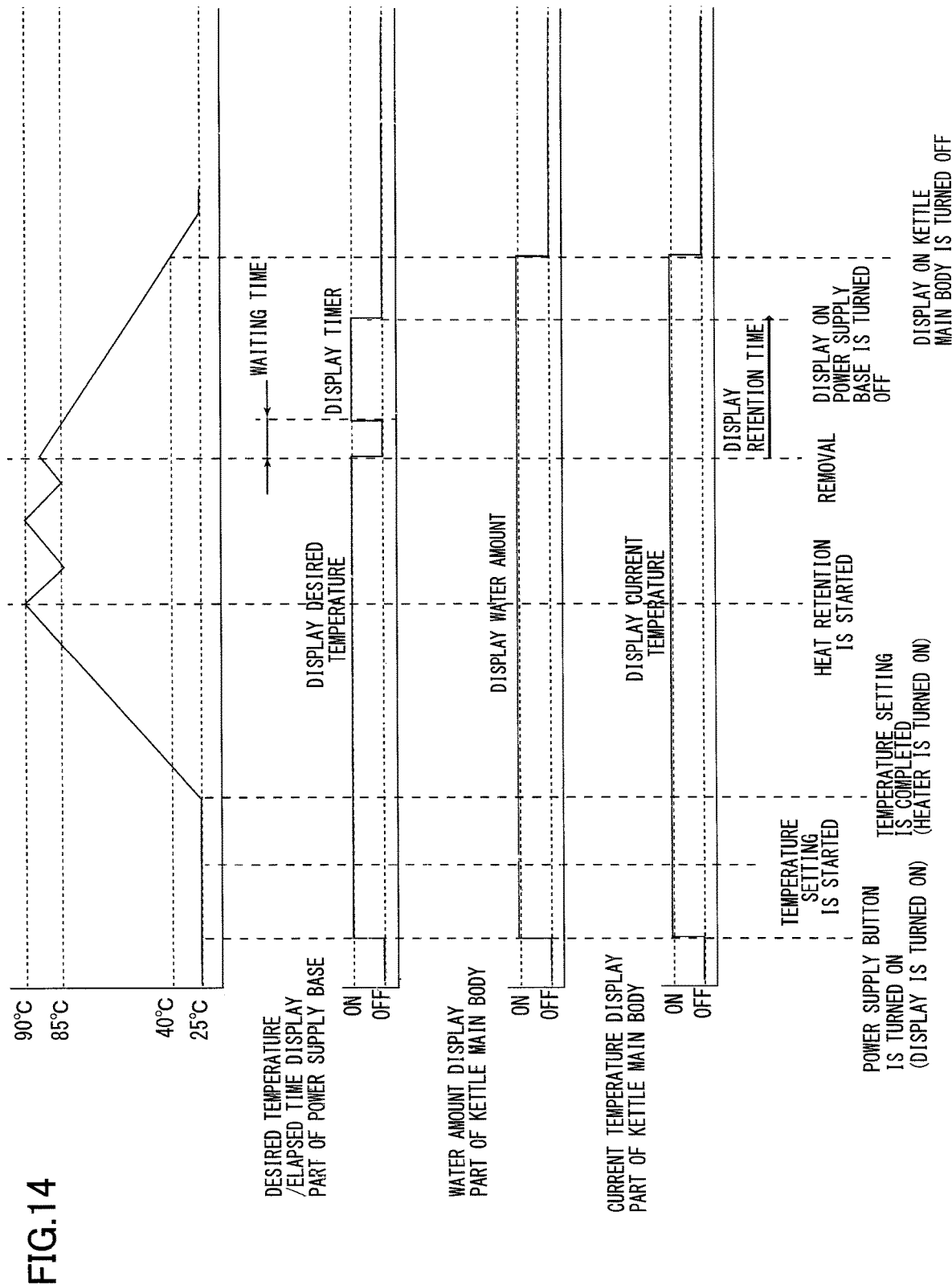
FIG. 14 is a diagram showing an example of a display transition in a state where the kettle main body is separated from the power supply base according to the third embodiment.

As shown in FIG. 14, in response to the kettle main body 20 being separated from the power supply base 40, the second control part 401 controls the desired temperature/elapsed time display driving part 407 to switch the display mode of the desired temperature/elapsed time display part 46 from the mode in which the desired temperature is displayed to the mode in which the elapsed time from a certain point in time is displayed. Note that the display mode of the water amount display part 26 and the display mode of the current temperature display part 27 are not changed even if the kettle main body 20 is separated from the power supply base 40. When a predetermined display retention time has elapsed since the kettle main body 20 is separated from the power supply base 40, the second control part 401 controls the desired temperature/elapsed time display driving part 407 to set the desired temperature/elapsed time display part 46 to the off state.

With the electric kettle 10 according to the third embodiment described above, the same advantages as those of the electric kettle 10 according to the second embodiment can be provided.

Note that the structures of the electric kettles 10 according to the first, second and third embodiments are not limited to those described above. In these embodiments, the driving power for the heater 31 and the driving power for the sensors or the like are significantly different from each other, so that the second power supply circuit 402 that generates the driving power for the heater 31 and the third power supply circuit 403 that generates the driving power for the sensors or the like are separately provided. In practice, however, a single power supply circuit can also be used. The second power supply circuit 402 may be provided in the kettle main body. In that case, the second power supply circuit 402 is connected to the utility power supply 60 via the terminals 35c and 55c, and generates the driving power for the heater 31 by using the electric power supplied from the utility power supply 60 under the control of the first control part 301. With this configuration, the heater 31 requires no power supply terminal, and the arrangement of the connection terminals can be simplified. Furthermore, the temperature detection part 306 and the second control part 401 need not be connected to each other via the terminals 35a and 55a, and the first control part 301 and the second control part 401 may be connected to each other via the terminals 35a and 55a.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

20 . . . kettle main body, 21 . . . exterior case, 22 . . . lid, 23 . . . handle, 24 . . . nozzle, 26 . . . first display part, 28 . . . battery, 29 . . . container, 30 . . . first control substrate, 31 . . . heater, 32 . . . temperature detection electrode, 33 . . . water amount detection electrode unit, 35 . . . kettle main body-side connection part, 40 . . . power supply base, 41 . . . pedestal, 42 . . . mount, 43 . . . power supply button, 47 . . . second control substrate, 48 . . . power supply cable, 55 . . . power supply base-side connection part

The invention claimed is:

1. An electric kettle, comprising:
a power supply base; and
a kettle main body removably placed on the power supply base,
wherein the kettle main body has:
a container;
a heater provided on the container;
a water amount sensor that detects an amount of water in the container;
a water temperature sensor that detects a current temperature of the water in the container;
a first display part that displays information on the amount of water detected by the water amount sensor,
a heater control part that controls the heater such that, after the current temperature reaches a desired temperature and until a heat retention time elapses, the current temperature is maintained at or higher than a heat retention temperature; and
a first control part that controls the first display part such that, after the current temperature reaches the desired temperature and the heat retention time elapses, when the current temperature falls to a safety temperature lower than the heat retention temperature, the first display part is turned off,
wherein the power supply base has:
a power supply cable to be connected to a utility power supply;
an operation part that receives a user operation concerning the desired temperature of the water;

a power supply circuit that generates a driving power for the heater from an electric power supplied from the utility power supply; and a second display part that displays at least one of the current temperature and the desired temperature, wherein a second control part that controls the second display part such that, after the current temperature reaches the desired temperature, the second display part is turned off when after the current temperature falls to the safety temperature.

2. The electric kettle according to claim 1, wherein the first control part controls the first display part to turn off the first display part when a predetermined display retention time has elapsed since the kettle main body is separated from the power supply base, and the second control part controls the second display part to turn off the second display part when the display retention time has elapsed since the kettle main body is separated from the power supply base.

3. The electric kettle according to claim 1, wherein the second control part controls the second display part to make the second display part display a timer in response to the kettle main body being separated from the power supply base.

4. The electric kettle according to claim 3, wherein the second control part controls the second display part to make the second display part display an elapsed time from a point in time when a predetermined time has elapsed since the kettle main body is separated from the power supply base.

5. The electric kettle according to claim 1, wherein the operation part separately receives an operation of setting an integral part of the desired temperature and an operation of setting a decimal part of the desired temperature.

6. The electric kettle according to claim 1, wherein the kettle main body further has an exterior case that has a cylindrical shape and houses the container, a handle provided on a circumferential surface of the exterior case, and a battery included in the handle.

* * * * *